(12) United States Patent
An et al.

(10) Patent No.: US 10,915,718 B2
(45) Date of Patent: Feb. 9, 2021

(54) RADIO FREQUENCY POSITIONING SYSTEM

(71) Applicant: METAL INDUSTRIES RESEARCH & DEVELOPMENT CENTRE, Kaohsiung (TW)

(72) Inventors: Nai-Chun An, Kaohsiung (TW); Yuan-Chih Lin, Yunlin County (TW); Hsiu-An Tsai, Kaohsiung (TW); Shuo-Ching Chen, Tainan (TW); Chih-Lung Lin, Kaohsiung (TW)

(73) Assignee: METAL INDUSTRIES RESEARCH & DEVELOPMENT CENTRE, Kaohsiung (TW)

( * ) Notice: Subject to any disclaimer, the term of this patent is extended or adjusted under 35 U.S.C. 154(b) by 250 days.

(21) Appl. No.: 16/230,988

(22) Filed: Dec. 21, 2018

(65) Prior Publication Data
US 2020/0202087 A1    Jun. 25, 2020

(51) Int. Cl.
*G06K 7/10* (2006.01)
*G06K 19/077* (2006.01)

(52) U.S. Cl.
CPC ... *G06K 7/10366* (2013.01); *G06K 19/07758* (2013.01); *G06K 19/07773* (2013.01)

(58) Field of Classification Search
CPC ......... G06K 7/10366; G06K 19/07773; G06K 19/07758; G06K 7/10475; G01S 1/02
See application file for complete search history.

(56) References Cited

U.S. PATENT DOCUMENTS 8,026,795 B2 * 9/2011 Qi .................. G01D 9/005
340/10.1

FOREIGN PATENT DOCUMENTS

TW    I593987 B    8/2017

* cited by examiner

*Primary Examiner* — Sonji N Johnson
(74) *Attorney, Agent, or Firm* — Birch, Stewart, Kolasch & Birch, LLP

(57) ABSTRACT

A radio frequency (RF) positioning system comprises transceivers, positioning tags, processing units and a computing host. One or multiple positioning tags are attached to a target object being located. When the transceivers first generate and transmit transmission signals, one or multiple tag antennas in the positioning tag receive the transmission signals and transmit back modulated signals. The transceivers then receive and transmit the modulated signals to the processing units. The processing units are configured to obtain received signals, and calculate frequency differences based on the received signals and the transmission signals. The computing host calculates position coordinates of tag antennas based on the frequency differences, and then calculates the orientation of the target object being located according to the position coordinates of the tag antennas.

10 Claims, 11 Drawing Sheets

RADIO FREQUENCY POSITIONING SYSTEM

BACKGROUND OF THE INVENTION

1. Field of the Invention

The present invention is a radio frequency (RF) positioning system that utilizes two-way transmission of RIP signals to locate a target position.

2. Description of the Related Art

Positioning systems are widely used in various applications, one of which is surgical positioning. Surgical positioning techniques include mechanical positioning, ultrasonic positioning, X-ray and computed tomography (CT) positioning, electromagnetic positioning, optical positioning, and the like. Most of the conventional positioning technology products used in surgical navigation are based on infrared optical positioning systems. The infrared optical positioning system usually consists of an optical probe and a dynamic reference frame (DRF) in that several reflective spheres are embedded. By mounting the DRF on a patient's affected part and on the surgical instrument, tracking the relative position between the surgical instrument and the affected part through optical techniques, and by further adopting surgical navigation software to assist the physicians to operate the instrument accurately, the quality of the operations is thereby significantly improved. Clinical data show that optical positioning technology has a line-of-sight issue, and the DRF has a size issue and usually reduces operation space, and the surgical instrument with the DRF installed is still cumbersome; hence, the physician's manipulation of the surgical instrument is adversely affected accordingly.

SUMMARY OF TEM INVENTION

In view of the above-mentioned limitations of the conventional positioning systems, the main objective of the present invention is to ameliorate the above-mentioned limitations by providing an RE positioning system that utilizes the transmission of RE signals for positioning.

Accordingly, the present invention proposes an RE positioning system that comprises a plurality of transceivers, at least one positioning tag, at least one processing unit, and a computing host.

Each transceiver includes:
a radiating circuit connected to a radiating antenna, and the radiating circuit generating a transmission signal which is transmitted to the outside through the radiating antenna, and
a receiving circuit connected to a receiving antenna, and through the receiving antenna, the receiving circuit receiving a modulated signal transmitted by the at least one positioning tag.

The at least one positioning tag includes:
at least one tag circuit each respectively connected to a corresponding tag antenna, and the tag circuit receiving the transmission signals transmitted by each transceiver through the corresponding tag antenna, mixing an identification code exclusive to the corresponding tag antenna with the received transmission signals to generate the modulated signals, and transmitting the modulated signals to the outside through the corresponding tag antenna.

The at least one processing unit, connected to each transceiver, includes:
an identification circuit that provides an identification code corresponding to the tag antenna, and
a plurality of processing circuits whose number is the same as the number of the transceivers, wherein, according to the identification code provided by the identification circuit, each one of the plurality of the processing circuits is configured to obtain a received signal from the modulated signal transmitted by the corresponding transceiver, and calculates a frequency difference between the transmission signal of the same transceiver and the received signal.

The computing host, connected to each of the at least one processing unit and receiving the frequency differences calculated by each of the plurality of processing circuits, calculates distances between the tag antenna and each transceiver according to the frequency differences, and calculates a position coordinate of the tag antenna according to known position coordinates of each transceiver.

BRIEF DESCRIPTION OF THE DRAWINGS

FIG. 7A, is a schematic of the frequency differences calculation by the processing units of the present invention.

DETAILED DESCRIPTION OF THE INVENTION

These and other aspects of the embodiments herein will be better appreciated and understood when considered in conjunction with the following description and the accompanying drawings.

Figure 1:
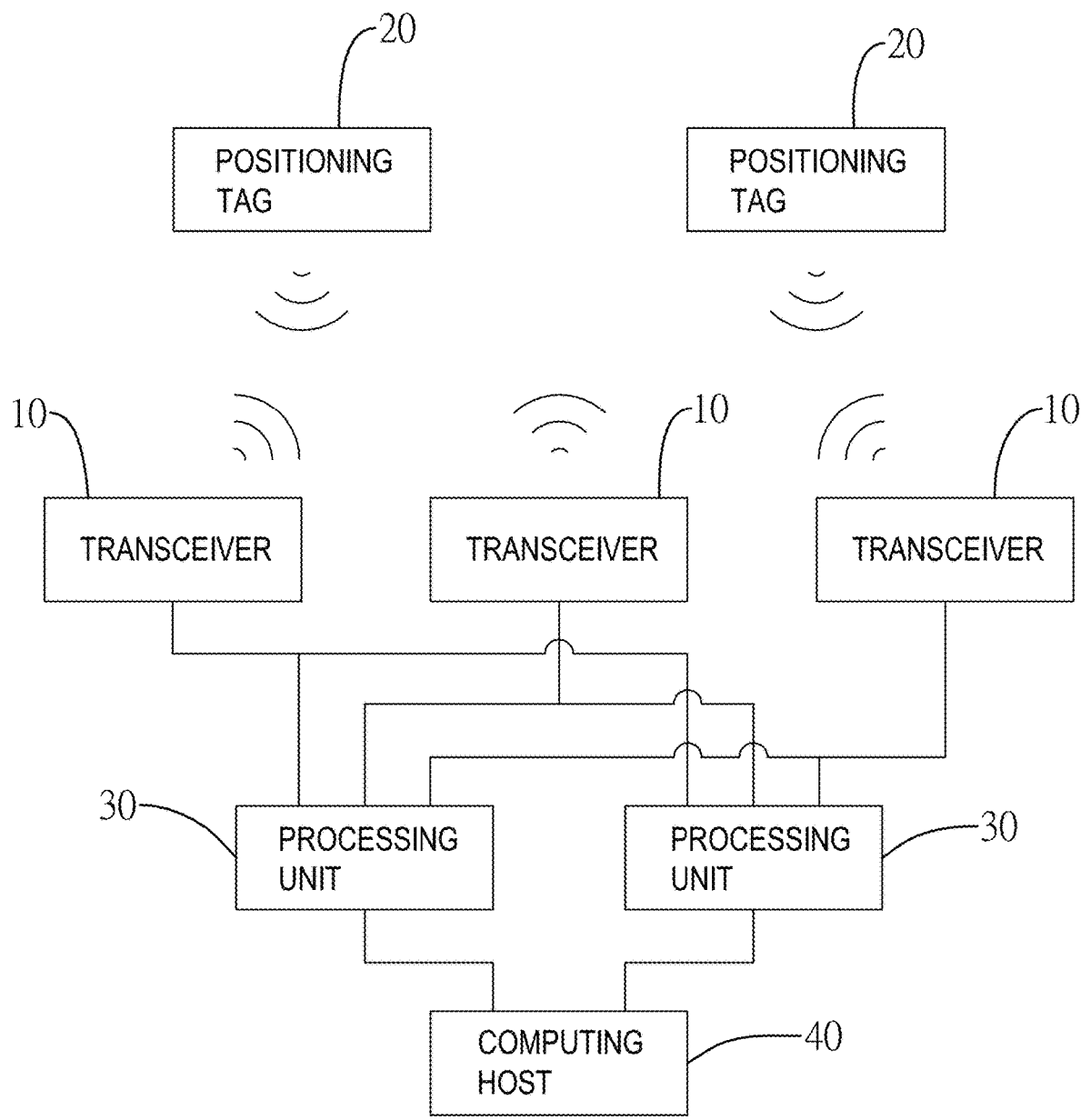
FIG. 1 shows a block diagram of an RF positioning system of the present invention.

With reference to FIG. 1 the present invention comprises a computing host 40, a plurality of transceivers 10, positioning tags 20, and processing units 30.

Figure 2A:
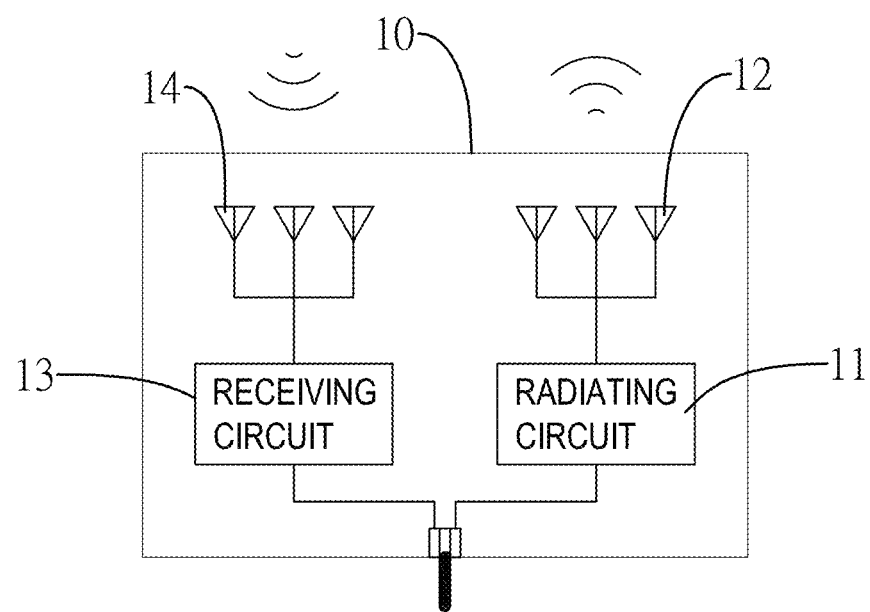
FIG. 2A shows a block diagram of the transceiver of the present invention.
Figure 2B:
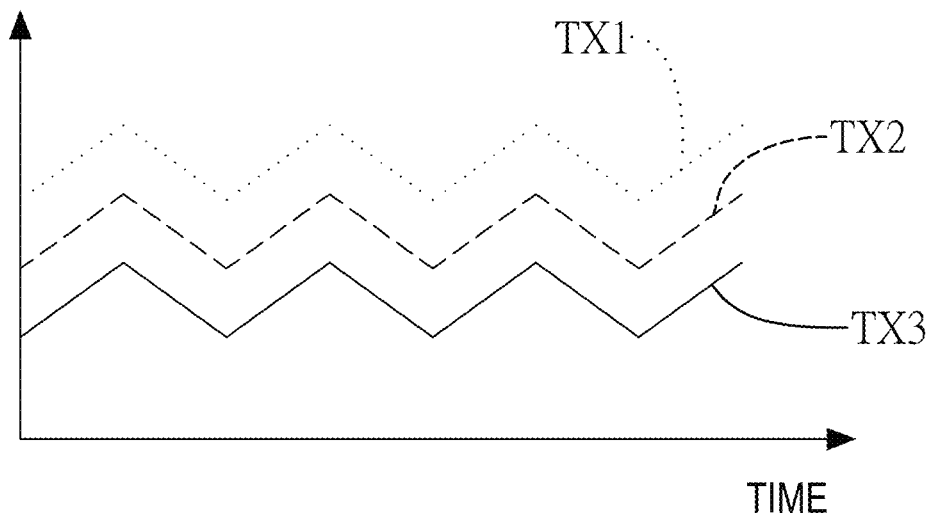
FIG. 2B shows a waveform diagram of transmission signals with different frequencies.
Figure 2C:
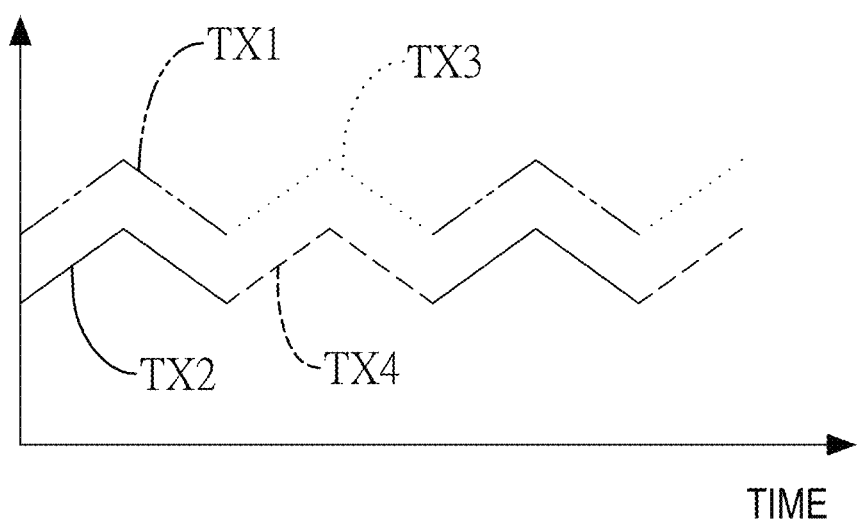
FIG. 2C shows a waveform diagram of transmission signals with different frequencies in different time slots.

As shown in FIG. 2A, each transceiver 10 includes a radiating circuit 11, a radiating antenna 12, a receiving circuit 13, and a receiving antenna 14. The radiating circuit 11 connected to the radiating antenna 12 generates a transmission signal and transmits the transmission signal through the radiating antenna 12 in the form of electromagnetic waves. The receiving antenna 14 is configured to receive a modulated signal transmitted back from the positioning tag 20, and the receiving circuit 13 is connected to the receiving antenna 14 to obtain the received modulated signal from the receiving antenna 14. In the positioning system of the present invention, the transmission signal is frequency modulated. In order to distinguish the electromagnetic waves transmitted by each transceiver 10, the transmission signals generated by each radiating circuit 11 are designed to have different frequency modulation ranges. For example, FIG. 2B shows that if three transceivers are used, three sets of transmission signals TX1, TX2 and TX3 may be of different frequencies; or as shown in FIG. 2C, in a positioning system with four transceivers, four sets of transmission signals TX1, TX2, TX3 and TX4 can be distinguished by adopting the time-division and frequency-division method. For example, in the same frequency modulation interval, the transmission signals TX1 to TX4 can be alternatively generated by the radiating circuit 11 in successive time slots, such that the frequencies of the simultaneously transmitted electromagnetic waves do not overlap. The receiving circuit 13 may perform filtering on the received modulated signal to remove the environmental interference noise, and then transmits the filtered received modulated signal to the processing unit 30.

Figure 3:
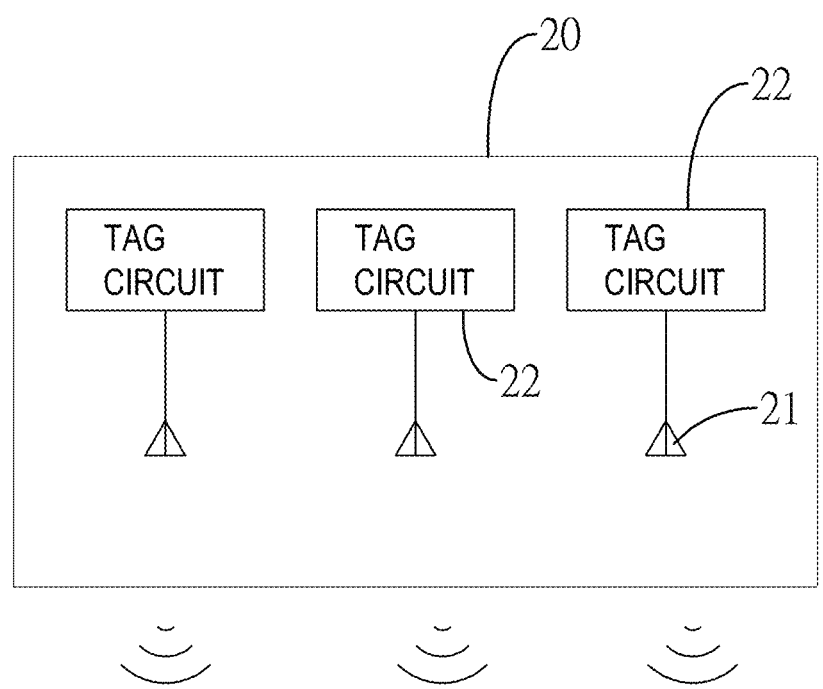
FIG. 3 shows a block diagram of the positioning tag of the present invention.

With reference to FIG. 3, the positioning tag 20 includes at least one tag antenna 21 and a tag circuit 22 corresponding to the tag antenna 21. For example, the same positioning tag 20 includes a plurality of tag antennas 21 and corresponding tag circuits 22 respectively. The tag antenna 21 receives the transmission signal transmitted by the transceiver 10, and then, the tag circuit 22 mixes said transmission signal with an exclusive identification code of the corresponding tag antenna 21 to generate a modulated signal, and afterwards, the modulated signal is transmitted back to the transceiver 10 through the tag antenna 21 in the form of electromagnetic waves. Accordingly, different tag circuits 22 respectively have different identification codes, and by means of the identification code, the modulated signal can be identified to be transmitted back from whichever tag antenna 21.

Figure 4A:
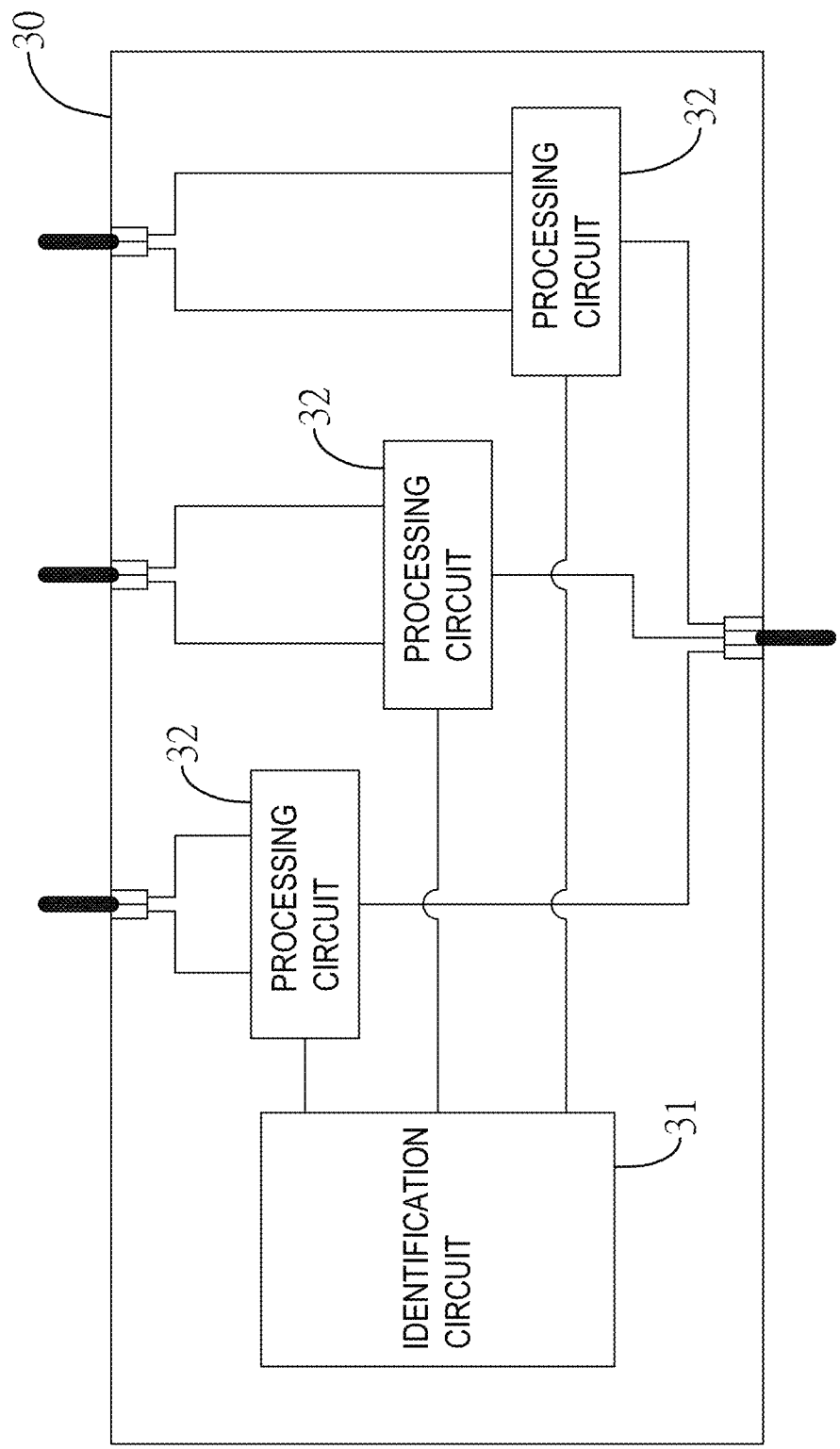
FIG. 4A shows a block diagram of the processing unit of the present invention.
Figure 4B:
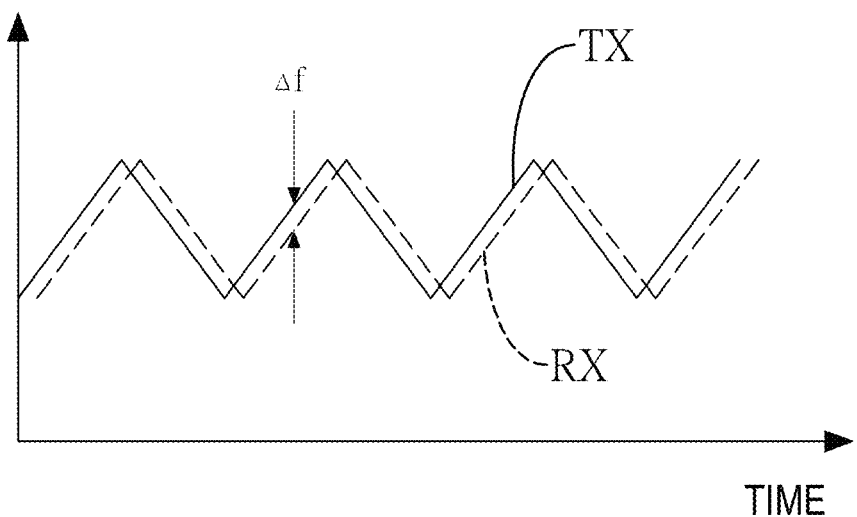
FIG. 4B shows a diagram of the frequency difference Δf between the transmission signal TX and the received signal RX.

With reference to FIG. 1 and FIG. 4A, the processing unit 30 is connected to each transceiver 10, for example through wire, and processes the received modulated signal from the transceiver 10 to obtain the frequency variation resulted from the initial transmission of the transmission signal by the transceiver 10, to the transmitted signal back from the tag antenna 21, and finally to the received modulated signal by the transceiver 10. The aforesaid frequency variation is used by the computing host 40 to analyze the straight line distances between each transceiver 10 and the tag antenna 21. Each processing unit 30 is responsible for processing the modulated signal transmitted back from a respective tag antenna 21; hence the total number of the processing units 30 is equal to the total number of the tag antennas 21. Each processing unit 30 includes an identification circuit 31 and a plurality of processing circuits 32. The identification circuit 31 provides an identification code of its corresponding tag antenna 21 for the processing circuit 32 so that the processing circuit 32 can remove the identification code of the received modulated signal and thereby result in a received signal RX. The required number of the processing circuits 32 of each processing unit 30 is equal to the total number of the transceivers 10 in the system. With reference to FIG. 4B, each processing circuit 32 compares the received signal RX with the transmission signal TX to obtain a frequency difference $\Delta f$ for each transceiver 10.

The computing host 40 is connected to each processing unit 30 to receive frequency differences $\Delta f$ calculated by each processing circuit 32, and the distance d between each transceiver 10 and the tag antenna 21 can be calculated according to the frequency difference $\Delta f$. The formula for calculating the distance d is as follows:

$$d = \frac{c \times \Delta f}{2 \times (df/dt)}$$

In the formula above, c represents the propagation speed of electromagnetic wave; $\Delta f$ represents the frequency difference; and (df/dt) represents the amount of frequency change per unit time.

Figure 5A:
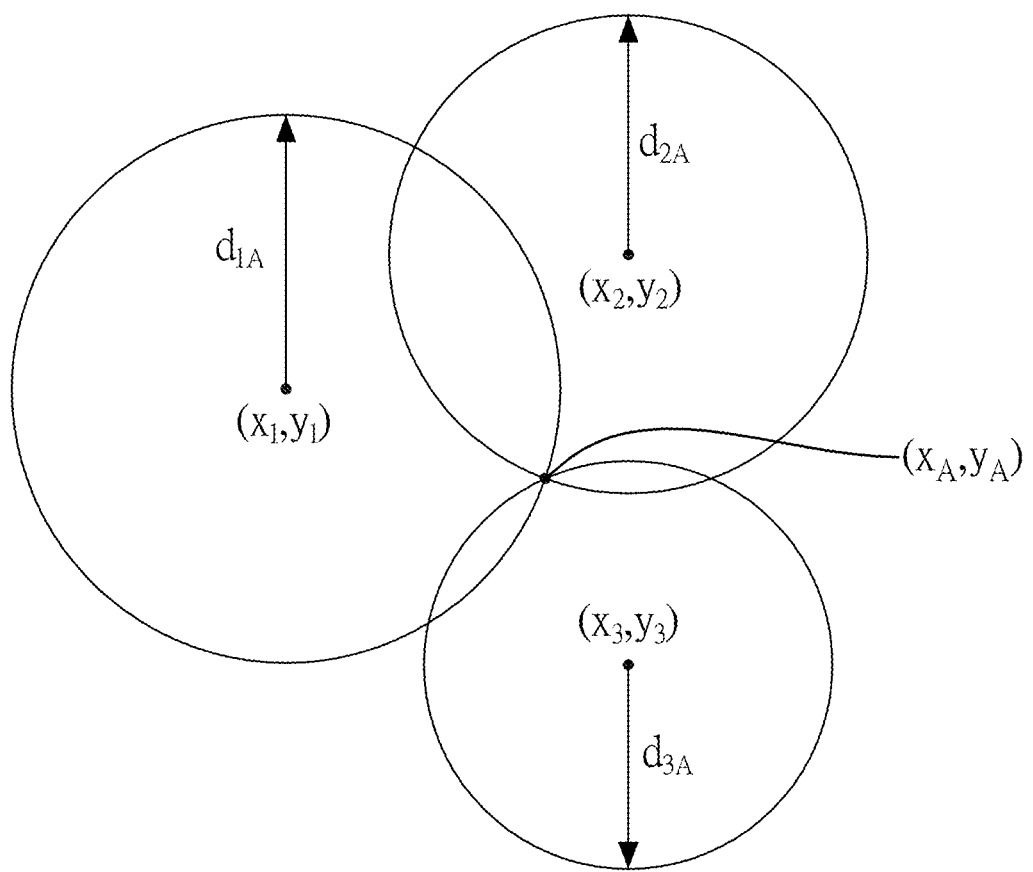
FIG. 5A shows a diagram of the 2D position coordinate calculation for the tag antenna by the computing host.
Figure 5B:
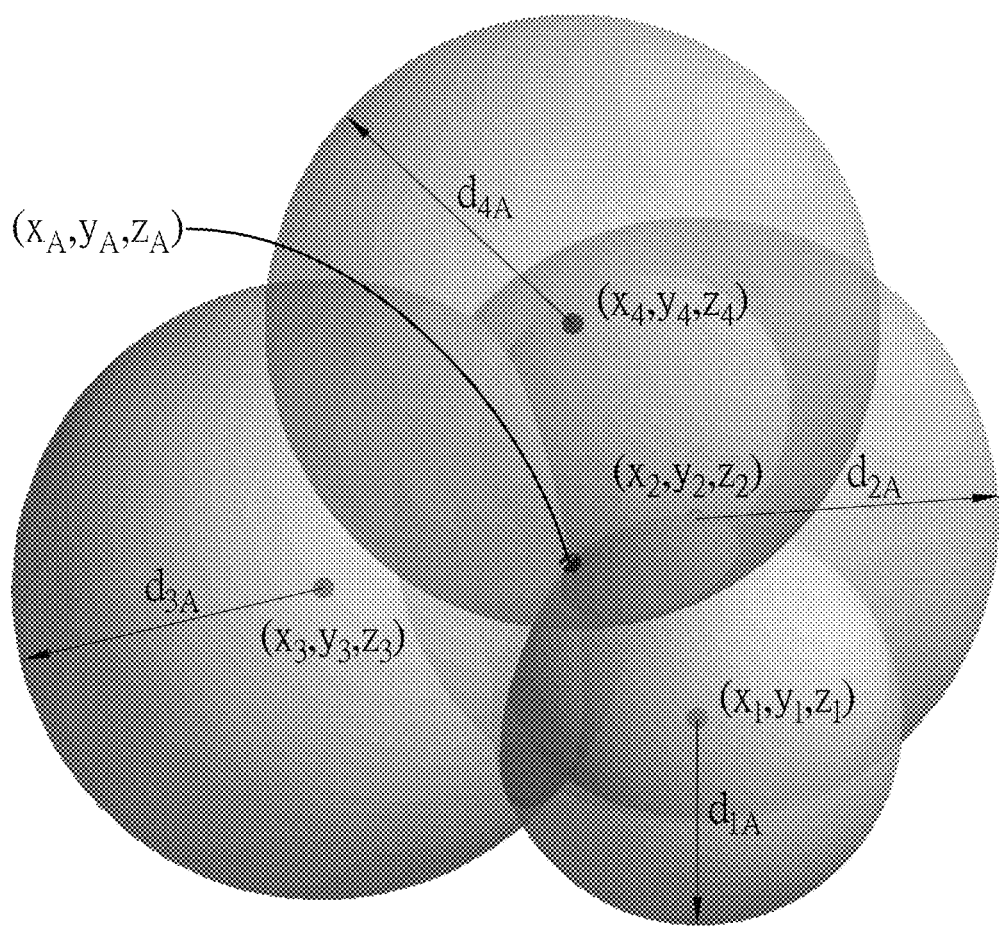
FIG. 5B shows a diagram of the 3D position coordinate calculation for the tag antenna by the computing host.

With reference to FIG. 5A and FIG. 5B, according to the geometric principle, the computing host 40 further calculates the position coordinate of a tag antenna 21 based on all the distances d between all the transceivers 10 and the tag antenna 21 plus the position coordinates of all the transceivers 10.

In FIG. 5A, the computing host 40 can get the 2D position coordinate $(x_A, y_A)$ of a tag antenna 21 in a two-dimensional space by calculating the coordinate of the intersection point of three circles whose centers of the circles are respectively the known position coordinates $(x_1, y_1)$, $(x_2, y_2)$, $(x_3, y_3)$ of the three transceivers 10 and radii of the circles are respectively the relative distances $d_{1A}$, $d_{2A}$, and $d_{3A}$ between the three transceivers 10 and the tag antenna 21. In FIG. 5B, the computing host 40 can get the 3D position coordinate $(x_A, y_A, z_A)$ of a tag antenna 21 in a three-dimensional space by calculating the coordinate of the intersection point of four spheres whose centers of the spheres are respectively the known position coordinates $(x_1, y_1, z_1)$, $(x_2, y_2, z_2)$, $(x_3, y_3, z_3)$, $(x_4, y_4, z_4)$ of the four transceivers 10, and radii of the spheres are respectively the relative distances $d_{1A}$, $d_{2A}$, $d_{3A}$, and $d_{4A}$ between the four transceivers 10 and the tag antenna 21.

After the computing host 40 locates the coordinates of each tag antenna 21, the orientation of the target object to be located can be calculated according to the position coordinates of multiple tag antennas 21.

Figure 6:
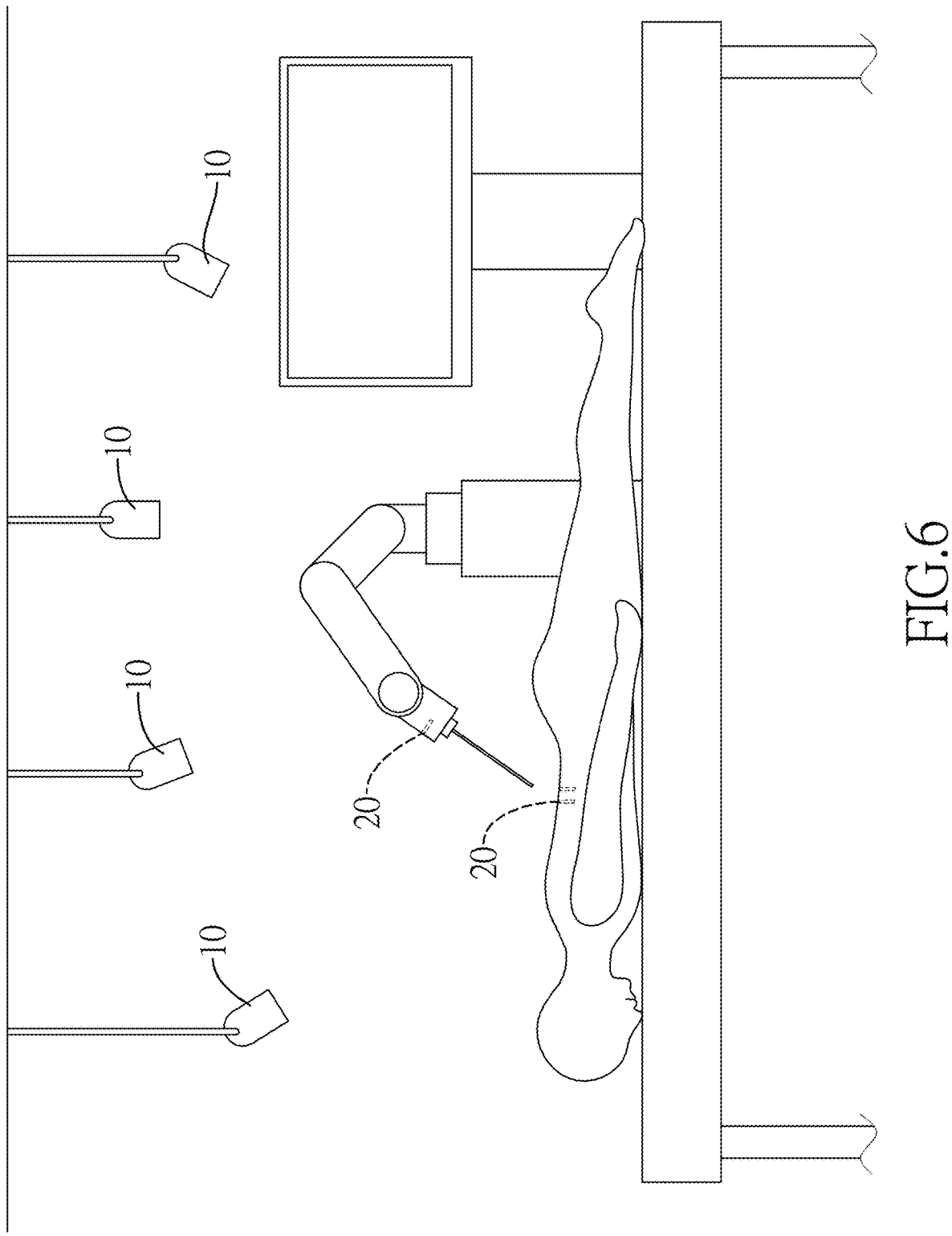
FIG. 6 shows a schematic of the positioning of surgical instruments as an application of the present invention.

The following example is to further illustrate the practical application of the above-mentioned system. With reference to FIG. 6, four transceivers 10 are fixedly disposed in an environmental space, and the position coordinates $(x_1, y_1, z_1)$, $(x_2, y_2, z_2)$, $(x_3, y_3, z_3)$, $(x_4, y_4, z_4)$ of the four transceivers 10 are known information. The present invention locates the positioning tags 20 in the system by calculating and tracking the position of each tag antenna 21 in each positioning tag 20. One of the applications is to mount the positioning tag 20 on a target object to be located, for example, on a patient's affected part and on a surgical instrument; and at least one positioning tag 20 is installed on each target object to be located, so that the relative position relationship between the affected part and the surgical instrument can be confirmed immediately during the operation, and by further incorporating surgical navigation software, the physician can accurately operate the instruments according to pre-planned procedures to improve the efficiency and quality of the operation.

Figure 7A:
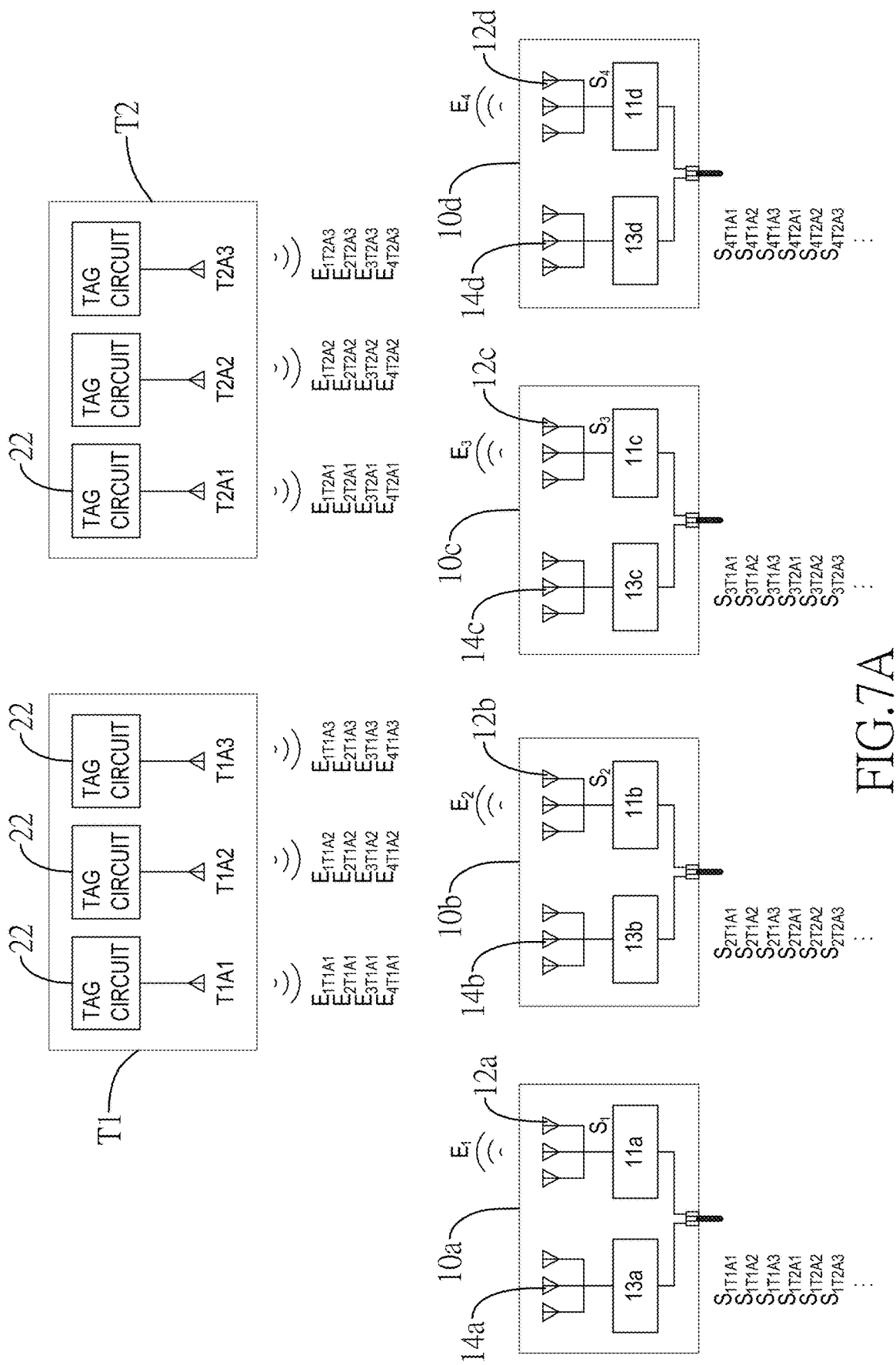
FIG. 7A shows a schematic of signal transmission among multiple transceivers and the positioning tags as a 3D positioning application of the present invention.
Figure 7B:
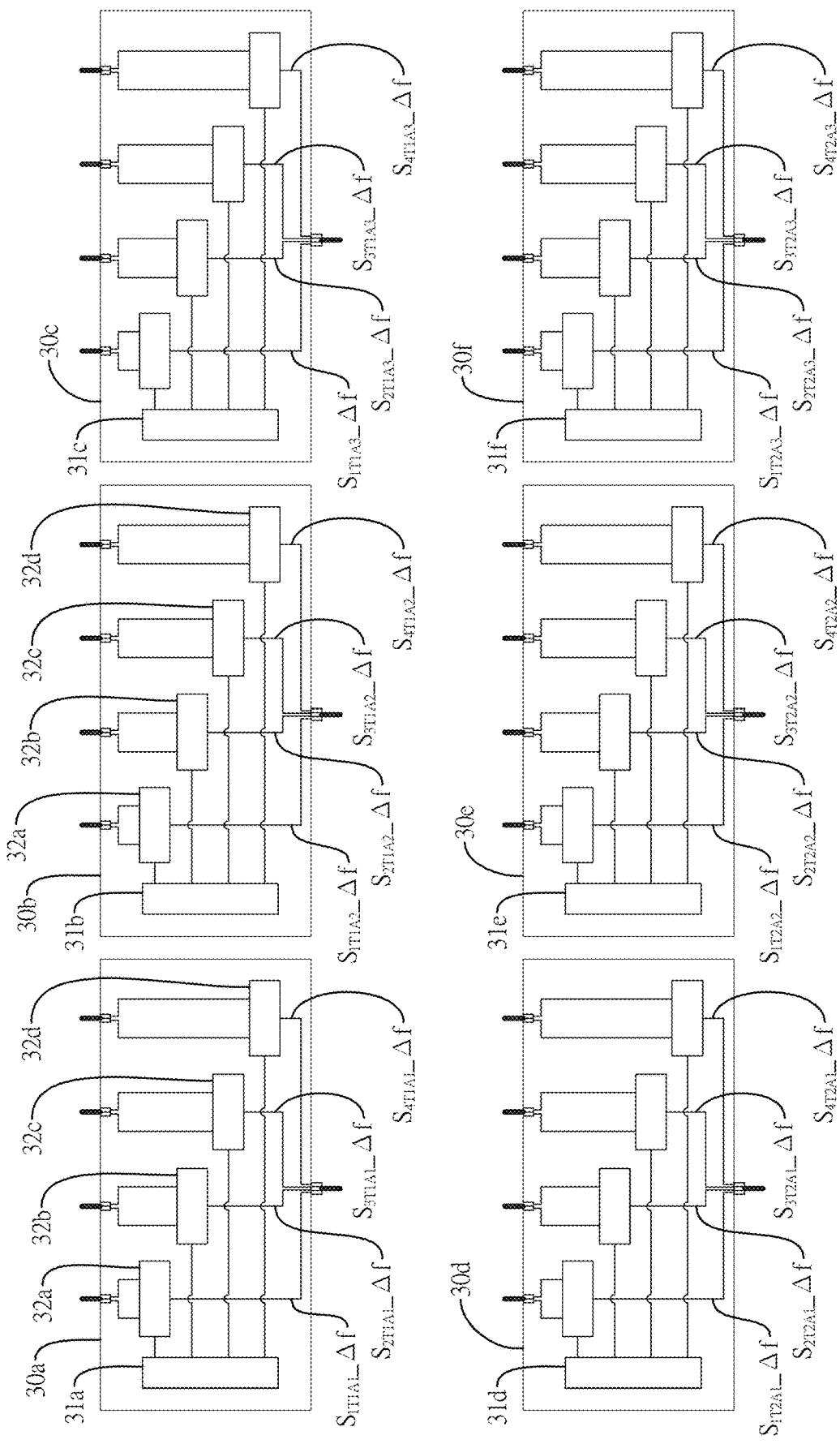
FIG. 7B, following

With reference to FIG. 7A and FIG. 7B, this embodiment comprises four transceivers 10a, 10b, 10c, 10d, two positioning tags (with three tag antennas in each positioning tag), six processing units 30a, 30b, 30c, 30d, 30e, 30f (with four processing circuits 32a, 32b, 32c, 32d in each processing unit), and one computing host 40. In order to facilitate the description of the following circuit actions, in particular, two positioning tags are respectively indicated by T1 and T2. The three tag antennas in the first positioning tag T1 are respectively labeled as T1A1, T1A2, T1A3, and the three tag antennas in the second positioning tag T2 are respectively labeled as T2A1, T2A2, T2A3.

Firstly, the transmission signals generated by the radiating circuits 11a to 11d of the four transceivers 10a to 10d are respectively denoted as $S_1$, $S_2$, $S_3$, and $S_4$ which are transmitted through the radiating antennas 12a to 12d of the four transceivers 10a to 10d as radiated electromagnetic weaves $E_1$, $E_2$, $E_3$, $E_4$ respectively.

The radiated electromagnetic wave $E_1$ is respectively received by the first, the second and the third tag antennas T1A1, T1A2, T1A3 in the first positioning tag T1, and the modulated electromagnetic waves $E_{1T1A1}$, $E_{1T1A2}$, and $E_{1T1A3}$ are generated accordingly. Similarly, the radiated electromagnetic wave $E_1$ is respectively received by the first, the second and the third tag antennas T2A1, T2A2, T2A3 in the second positioning tag T2, and the modulated electromagnetic waves $E_{1T2A1}$, $E_{1T2A2}$, and $E_{1T2A3}$ are generated accordingly.

Similarly, the radiated electromagnetic wave $E_2$ is respectively received by the first, the second and the third tag antennas T1A1, T1A2, T1A3 in the first positioning tag T1, and the modulated electromagnetic waves $E_{2T1A1}$, $E_{2T1A2}$, and $E_{2T1A3}$ are generated. Similarly, the radiated electromagnetic wave $E_2$ is respectively received by the first, the second and the third tag antennas T2A1, T2A2, T2A3 in the second positioning tag T2, and the modulated electromagnetic waves $E_{2T2A1}$, $E_{2T2A2}$, and $E_{2T2A3}$ are generated. By analogy, the radiated electromagnetic waves $E_3$ and $E_4$ are also respectively received by the tag antennas T1A1 to T1A3, T2A1 to T2A3 in the two positioning tags T1 and T2 and the corresponding modulated electromagnetic waves are generated accordingly.

The receiving antenna 14a of the first transceiver 10a receives at least the modulated electromagnetic waves $E_{1T1A1}$, $E_{1T1A2}$, $E_{1T1A3}$, $E_{1T2A1}$, $E_{1T2A2}$, $E_{1T2A3}$ and the like which are filtered by the receiving circuit 13a and then converted into corresponding filtered received modulated signals $S_{1T1A1}$, $S_{1T1A2}$, $S_{1T1A3}$, $S_{1T2A1}$, $S_{1T2A2}$, $S_{1T2A3}$ and the like. Similarly, the receiving antenna 14b of the second transceiver 10b receives at least the modulated electromagnetic waves $E_{2T1A1}$, $E_{2T1A2}$, $E_{2T1A3}$, $E_{2T2A1}$, $E_{2T2A2}$, $E_{2T2A3}$ and the like, which are filtered by the receiving circuit 13b and then converted into corresponding filtered received modulated signals $S_{2T1A1}$, $S_{2T1A2}$, $S_{2T1A3}$, $S_{2T2A1}$, $S_{2T2A2}$, $S_{2T2A3}$ and the like. Similarly, the third transceiver 10c and the fourth transceiver 10d at least respectively receive the corresponding modulated electromagnetic waves which are also converted into corresponding filtered received modulated signals accordingly.

With reference to FIG. 7B, in the first processing unit 30a, the first processing circuit 32a receives from the identification circuit 31a the identification code corresponding to the first tag antenna T1A1 in the first positioning tag T1, receives from the first transceiver 10a the transmission signal $S_1$ and filtered received modulated signals including at least $S_{1T1A1}$, $S_{1T1A2}$, $S_{1T1A3}$, $S_{1T2A1}$, $S_{1T2A2}$, $S_{1T2A3}$, etc., obtains a received signal $S_{1T1A1}'$ of the first tag antenna T1A1 in the first positioning tag T1, and calculates the frequency difference $S_{1T1A1}\_\Delta f$ based on the received signal $S_{1T1A1}'$ and the transmission signal $S_1$. Similarly, the second processing circuit 32b in the first processing unit 30a receives front the identification circuit 31a the identification code corresponding to the first tag antenna T1A1 in the first positioning tag T1, receives from the second transceiver 10b the transmission signal $S_2$ and filtered received modulated signals including at least $S_{2T1A1}$, $S_{2T1A2}$, $S_{2T1A3}$ $S_{2T2A1}$, $S_{2T2A2}$, $S_{2T2A3}$, etc., obtains a received signal $S_{2T1A1}'$ of the first tag antenna T1A1 in the first positioning tag T1, and calculates the frequency difference $S_{2T1A1}\_\Delta f$ based on the received signal $S_{2T1A1}'$ and the transmission signal $S_2$. Similarly, the third processing circuit 32c and the fourth processing circuit 32d in the first processing unit 30a respectively calculate the frequency differences $S_{3T1A1}\_\Delta f$ and $S_{4T1A1}\_\Delta f$.

In the second processing unit 30b, the first processing circuit 32a receives from the identification circuit 31b the identification code corresponding to the second tag antenna T1A2 in the first positioning tag T1, receives from the first transceiver 10a the transmission signal $S_1$ and filtered received modulated signals including at least $S_{1T1A1}$, $S_{1T1A2}$, $S_{1T1A3}$, $S_{1T2A1}$, $S_{1T2A2}$, $S_{1T2A3}$, etc., obtains a received signal $S_{1T1A2}'$ of the second tag antenna T1A2 in the first positioning tag T1, and calculates the frequency difference $S_{1T1A2}\_\Delta f$ based on the received signal $S_{1T1A2}'$ and the transmission signal $S_1$. Similarly, the second processing circuit 32b in the second processing unit 30b receives from the identification circuit 31b the identification code corresponding to the second tag antenna T1A2 in the first positioning tag T1, receives from the second transceiver 10b the transmission signal $S_2$ and filtered received modulated signals including at least $S_{2T1A1}$, $S_{2T1A2}$, $S_{2T1A3}$, $S_{2T2A1}$, $S_{2T2A2}$, $S_{2T2A3}$, etc., obtains a received signal $S_{2T1A2}'$ of the second tag antenna T1A2 in the first positioning tag T1, and calculates the frequency difference $S_{2T1A2}\_\Delta f$ based on the received signal $S_{2T1A2}'$ and the transmission signal $S_2$. Similarly, the third processing circuit 32c and the fourth processing circuit 32d in the second processing unit 30b respectively calculate the frequency differences $S_{3T1A2}\_\Delta f$ and $S_{4T1A2}\_\Delta f$.

Similarly, the third processing unit 30c, the fourth processing unit 30d, the fifth processing unit 30e, and the sixth processing unit 30f respectively calculate the frequency differences corresponding to the other tag antennas T1A3, T2A1, T2A2, and T2A3.

The computing host 40 receives the four frequency differences $S_{1T1A1}\_\Delta f$, $S_{2T1A1}\_\Delta f$, $S_{3T1A1}\_\Delta f$, $S_{4T1A1}\_\Delta f$ calculated by the first processing unit 30a, and firstly calculates the relative distances $d_{1T1A1}$, $d_{2T1A1}$, $d_{3T1A1}$, $D_{4T1A1}$ between the tag antenna T1A1 of the first positioning tag T1 and the four transceivers 10a to 10d. Then based on the known position coordinates $(x_1, y_1, z_1)$, $(x_2, y_2, z_2)$, $(x_3, y_3, z_3)$, $(x_4, y_4, z_4)$ of the four transceivers 10a to 10d, the computing host 40 calculates the position coordinate $(x_{T1A1}, y_{T1A1}, z_{T1A1})$ of the first tag antenna T1A1 in the first positioning tag T1.

The computing host 40 receives the four frequency differences $S_{1T1A2}\_\Delta f$, $S_{2T1A2}\_\Delta f$, $S_{3T1A2}\_\Delta f$, $S_{4T1A2}\_\Delta f$ calculated by the second processing unit 30b, and firstly calculates the relative distances $d_{1T1A2}$, $d_{2T1A2}$, $d_{3T1A2}$, $d_{4T1A2}$ between the tag antenna T1A2 of the first positioning tag T1 and the four transceivers 10a to 10d. Then based on the known position coordinates $(x_1, y_1, z_1)$, $(x_2, y_2, z_2)$, $(x_3, y_3, z_3)$, $(x_4, y_4, z_4)$ of the four transceivers 10a to 10d, the computing host 40 calculates the position coordinate $(x_{T1A2}, y_{T1A2}, z_{T1A2})$ of the second tag antenna T1A2 in the first positioning tag T1.

Similarly, the computing host 40 receives the frequency differences from the third processing unit 30c, the fourth processing unit 30d, the fifth processing unit 30e, and the sixth processing unit 30f, and then calculates the position coordinates $(x_{T1A3}, y_{T1A3}, z_{T1A3})$, $(x_{T2A1}, y_{T2A1}, z_{T2A1})$, $(x_{T2A2}, y_{T2A2}, z_{T2A2})$, $(x_{T2A3}, y_{T2A3}, z_{T2A3})$ of the other tag antennas T1A3, T2A1, T2A2, and T2A3.

After obtaining the position coordinate of each tag antenna, the computing host 40 can further calculate the orientation $(u_{T1}, v_{T1}, w_{T1})$ of the first positioning tag T1 based on the position coordinates $(x_{T1A1}, y_{T1A1}, z_{T1A1})$, $(x_{T1A2}, y_{T1A2}, z_{T1A2})$, $(x_{T1A3}, y_{T1A3}, z_{T1A3})$ of the three tag antennas T1A1 to T1A3 in the first positioning tag T1. The computing host 40 also calculates the orientation $(u_{T2}, v_{T2}, w_{T2})$ of the second positioning tag T2 based on the position coordinates $(x_{T2A1}, y_{T2A1}, z_{T2A1})$, $(x_{T2A2}, y_{T2A2}, z_{T2A2})$, $(x_{T2A3}, y_{T2A3}, z_{T2A3})$ of the three tag antennas T2A1 to T2A3 in the second positioning tag T2.

Taking the orientation $(u_{T1}, y_{T1}, w_{T1})$ of the first positioning tag T1 as an example, the calculation is as follows:

$$u_{T1}=(x_{T1A2}-x_{T1A1}, y_{T1A2}-y_{T1A1}, z_{T1A2}-z_{T1A1})$$

$$v_{T1}'=(x_{T1A3}-x_{T1A1}, y_{T1A3}-y_{T1A1}, z_{T1A3}-z_{T1A1})$$

$$w_{T1}=u_{T1} \times v_{T1}'$$

$$v_{T1}=w_{T1} \times u_{T1}$$

Another embodiment comprises four transceivers 10a, 10b, 10c, 10d, three positioning tags T1, T2, T3 (one tag antenna in each positioning tag, and the three tag antennas of the three positioning tags are respectively labeled as T1A1, T2A1, T3A1), three processing units 30a, 30b, 30c (four processing circuits 32a, 32b, 32c, 32d in each processing unit), and one computing host 40. The three positioning tags are mounted on a target object to be located.

The computing host 40 receives the frequency differences from the three processing units 30a, 30b, 30c, and respectively calculates the position coordinates $(x_{T1A1}, y_{T1A1}, z_{T1A1})$, $(x_{T2A1}, y_{T2A1}, z_{T2A1})$, $(x_{T3A1}, y_{T3A1}, z_{T3A1})$ of the three tag antennas T1A1, T2A1, and T3A1. The computing host 40 can further calculate the orientation (u, v, w) of the target object according to the following formula:

$$u=(x_{T2A1}-x_{T1A1}, y_{T2A1}-y_{T1A1}, z_{T2A1}-z_{T1A1})$$

$$v'=(x_{T3A1}-x_{T1A1}, y_{T3A1}-y_{T1A1}, z_{T3A1}-z_{T1A1})$$

$$w=u \times v'$$

$$v=w \times u$$

In summary, the present invention locates the positions of the tag antennas based on the bidirectional signal transmission between the transceivers 10 and the positioning tag 20, and then further determines the orientation of the positioning tag 20. When the present invention is applied to surgical positioning, the target object to be located may be the patient's affected part and the surgical instrument, so that the relative position relationship between the affected part and the surgical instrument can be confirmed, and the doctor can operate the instrument more accurately to improve the quality of the operation.

In optical positioning technology, when the line-of-sight between the probe and the reflective sphere is blocked, the system cannot perform positioning. In contrast, the present invention, based on RF wireless signals, can effectively accomplish the positioning and avoid the line-of-sight issue as in the optical positioning systems, and thereby improves the capability for medical positioning systems.

The present invention transmits signals to a positioning tag 20 from the transceivers 10, and receives signals transmitted back from the positioning tag 20. Thereby the circuit sizes, external dimensions, weight, and power consumption of the positioning tag 20 are reduced, and the continuous operation time of the positioning tag 20 is improved so as to integrate with surgical instruments and navigation systems.

When the surgical instrument enters a human body, the actual positions of the surgical instrument are conventionally confirmed by taking X-ray images; by selecting RF signals within appropriate frequency bands, the RF positioning system of the present invention has the opportunity to be applied to in vivo surgical positioning, thereby reducing the number of X-ray images taken during the operation to avoid radiation hazards to medical personnel.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A radio frequency (RF) positioning system comprising:
a plurality of transceivers;
at least one positioning tag;
at least one processing unit; and
a computing host; wherein
each transceiver includes
a radiating circuit connected to a radiating antenna, and the radiating circuit generating a transmission signal which is transmitted to the outside through the radiating antenna; and
a receiving circuit connected to a receiving antenna, and through the receiving antenna, the receiving circuit receiving a modulated signal transmitted by the at least one positioning tag;
wherein the at least one positioning tag includes
at least one tag circuit each respectively connected to a corresponding tag antenna, and the tag circuit receiving the transmission signals transmitted by each transceiver through the corresponding tag antenna, and mixing an identification code exclusive to the corresponding tag antenna with the received transmission signals to generate the modulated signals, and transmitting the modulated signals to the outside through the corresponding tag antenna;
wherein the at least one processing unit, connected to each transceiver, includes
an identification circuit that provides an identification code corresponding to the tag antenna; and
a plurality of processing circuits whose number is the same as the number of the transceivers, wherein, according to the identification code provided by the identification circuit, each one of the plurality of the processing circuits is configured to obtain a received signal from the modulated signal transmitted by the corresponding transceiver, and calculates a frequency difference between the transmission signal of the same transceiver and the received signal; and
wherein the computing host, connected to each of the at least one processing unit and receiving the frequency differences calculated by each of the plurality of processing circuits, calculates distances between the tag antenna and each transceiver according to the frequency differences, and calculates a position coordinate of the tag antenna according to known position coordinates of each transceiver.

2. The RF positioning system as claimed in claim 1, wherein the plurality of radiating circuits of the plurality of transceivers respectively generate transmission signals of different frequencies.

3. The RF positioning system as claimed in claim 1, wherein the plurality of radiating circuits of the plurality of transceivers generate transmission signals in a time-division frequency-division manner, and the frequencies of the transmission signals transmitted at the same time do not overlap.

4. The RF positioning system as claimed in claim 1, wherein the at least one positioning tag includes a plurality of tag circuits, and each of the tag circuits is connected to a corresponding tag antenna.

5. The RF positioning system as claimed in claim 4, wherein the at least one positioning tag is a plurality of positioning tags, and the number of the processing units is the same as the total number of the tag antennas.

6. The RF positioning system as claimed in claim 5, wherein the computing host is configured to calculate the orientations of the plurality of positioning tags according to the position coordinates of the plurality of tag antennas of the plurality of positioning tags.

7. The RF positioning system as claimed in claim 4, wherein the total number of the tag antennas is the same as the number of the tag circuits.

8. The RF positioning system as claimed in claim 4, wherein the computing host is configured to calculate the orientation of the at least one positioning tag according to the position coordinates of the plurality of tag antennas of the at least one positioning tag.

9. The RF positioning system as claimed in claim 1, wherein the at least one positioning tag is a plurality of positioning tags, and the number of the processing units is the same as the total number of the tag antennas.

10. The RF positioning system as claimed in claim 9, wherein the computing host is configured to calculate at least one orientation according to the position coordinates of the at least one tag antenna of each of the plurality of positioning tags.

* * * * *